United States Patent
Chen et al.

(10) Patent No.: US 7,668,061 B2
(45) Date of Patent: Feb. 23, 2010

(54) METHOD AND APPARATUS FOR DETECTING SPECIFIC SIGNAL PATTERN IN A SIGNAL READ FROM AN OPTICAL DISC

(75) Inventors: Chun-Nan Chen, Taipei (TW); Wen-Yi Wu, Hsin-Chu Hsien (TW); Pi-Hai Liu, Taipei (TW)

(73) Assignee: MediaTek Incorporation, Hsin-Chu Hsien (TW)

( * ) Notice: Subject to any disclaimer, the term of this patent is extended or adjusted under 35 U.S.C. 154(b) by 898 days.

(21) Appl. No.: 11/160,289

(22) Filed: Jun. 17, 2005

(65) Prior Publication Data

US 2006/0077849 A1    Apr. 13, 2006

(30) Foreign Application Priority Data

Oct. 12, 2004    (TW) .............................. 93130879 A

(51) Int. Cl.
G11B 7/00    (2006.01)
(52) U.S. Cl. ............... 369/53.34; 369/53.31; 369/59.11
(58) Field of Classification Search ............... 369/53.11
See application file for complete search history.

(56) References Cited

U.S. PATENT DOCUMENTS 6,345,018 B1    2/2002    Maegawa

| | | | |
|---|---|---|---|
| 2003/0021217 A1* | 1/2003 | Kim et al. .............. | 369/124.12 |
| 2003/0090825 A1 | 5/2003 | Schep et al. | |
| 2003/0090977 A1 | 5/2003 | Schep et al. | |
| 2003/0099180 A1 | 5/2003 | Park et al. | |
| 2003/0123343 A1 | 7/2003 | Schep et al. | |
| 2003/0165095 A1* | 9/2003 | Iimura et al. ............. | 369/47.22 |
| 2003/0174603 A1 | 9/2003 | Schep et al. | |
| 2003/0227840 A1* | 12/2003 | Kishimoto et al. ....... | 369/44.32 |
| 2004/0174800 A1 | 9/2004 | Heemskerk | |
| 2004/0202079 A1* | 10/2004 | Oki .......................... | 369/59.2 |
| 2005/0088935 A1* | 4/2005 | Nakata et al. ............ | 369/47.27 |
| 2005/0195511 A1* | 9/2005 | Sano et al. .................... | 360/51 |
| 2006/0044960 A1* | 3/2006 | Liu et al. .................. | 369/44.13 |

* cited by examiner

Primary Examiner—Wayne R Young
Assistant Examiner—Lixi Chow
(74) Attorney, Agent, or Firm—Winston Hsu

(57) ABSTRACT

A method utilized for detecting a physical mark in a signal read from an optical disc, including: generating a matching signal capable of being utilized to identify the physical mark according to a reference clock and a wobble clock; generating a comparison signal by comparing the matching signal and a wobble data signal; determining whether a period of which the level of the comparison signal surpass a predetermined level within a predetermined period is greater than a threshold or not; and if the period greater than the threshold, generating an indication signal corresponding to the location of the physical mark. Wherein the wobble data signal and the wobble clock is generated according to the read back signal.

34 Claims, 10 Drawing Sheets

METHOD AND APPARATUS FOR DETECTING SPECIFIC SIGNAL PATTERN IN A SIGNAL READ FROM AN OPTICAL DISC

BACKGROUND

The present invention relates to methods and apparatus for detecting a specific signal pattern in a signal read from an optical disc.

Many kinds of optical discs utilize the wobble grooves formed on the disc's tracks to determine the disc's address information. As is well known in the art, a digital versatile disc (DVD) records a data's physical addresses utilizing certain specific physical marks formed on the wobble grooves such as phase modulated marks, frequency modulated marks, etc.

The wobble addressing methods adopted for utilization with the DVD discs varying depending on the disc format. For example, DVD-R/-RW discs utilize the land pre-pit (LPP) method, DVD+R/+RW discs utilize the address in pre-groove (ADIP) method, DVD-RAM discs utilize the complementary allocated pit addressing (CAPA) method, and finally the blu-ray discs utilize a combination of the minimum shift keying (MSK) modulation and the saw tooth wobble (STW) as their addressing method.

The pickup head of the conventional optical storage device receives a light beam reflected by the wobble grooves to produce a corresponding wobble signal. Physical marks exist within the wobble grooves and form specific signal patterns within the wobble signal. The optical storage device can obtain the DVD's address information by detecting the specific signal pattern that has been previously formed within the wobble signal.

In the related art, the optical storage device typically utilizes analog techniques to detect the specific signal pattern within the wobble signal. FIG. 1 shows a schematic diagram of a wobble signal having an MSK mark according to the related art. Each MSK mark has a length of three wobble periods. A signal waveform 100 represents a normal waveform of the wobble signal while a signal waveform 120 represents an MSK mark. FIG. 2 depicts a block diagram of a decoding device 200 utilized for detecting the MSK marks within a wobble signal of the related art. The conventional decoding device 200 typically includes two analog mixers 210, 220, two integrators 230, 240, two phase decision units 250, 260, and a single decision unit 270.

The analog mixers 210 and 220 respectively multiply a first encoding frequency $\phi_1(t)$ and a second encoding frequency $\phi_2(t)$ on a wobble signal x(t) so as to respectively retrieve wobble signals at specific frequencies. The results from analog mixers 210 and 220 are applied respectively to the integrators 230 and 240. The integrators 230 and 240 continue to perform integrations on wobble signals retrieved by the analog mixers 210 and 220, respectively. The phase decision units 250 and 260 respectively compare a predetermined threshold value with the integrated values from the integrators 230 and 240 to determine the phase of the wobble signal. Finally, the location of an MSK mark within the wobble signal is determined by the decision unit 270 of the decoding device 200 according to the determining results of the phase decision units 250 and 260.

Unfortunately, the analog techniques, commonly referred to as super heterodyne architecture, employed by the conventional decoding device 200 to achieve detection of the MSK marks, increase the complexity of the circuitry designs. Furthermore, when the rotation speed of the optical disc changes, the encoding frequencies $\phi1(t)$ and $\phi2(t)$ employed in the analog mixers 210 and 220 for mixing the wobble signal should also be modified accordingly. The circuitry control to achieve this further increases the circuitry's complexity. This results in the added difficulty of circuitry control.

SUMMARY OF THE INVENTION

A signal pattern detecting apparatus for detecting a specific signal pattern in a read back signal read from an optical disc is disclosed. The signal pattern detecting apparatus comprises a matching signal generator for generating a matching signal, which is capable of being utilized to identify the specific signal pattern, according to a reference clock and a wobble clock; a signal comparing device electrically connected to the matching signal generator for comparing the matching signal with a wobble data signal to generate a comparison signal; and a decision circuit electrically connected to the signal comparing device for determining if a period reaches a threshold value, wherein the period corresponds to how long the comparison signal reaches a predetermined level. If the period reaches the threshold value then decision circuit toggles an indication signal corresponding to a location of the specific signal pattern; wherein both the wobble data signal and the wobble clock are derived from the read back signal.

A method for detecting a specific signal pattern in a read back signal read from an optical disc is disclosed. The method comprises: generating a matching signal, which is capable of identifying the specific signal pattern, according to a reference clock and a wobble clock; comparing the matching signal with a wobble data signal to generate a comparison signal; determining if a period reaches a threshold value, wherein the period corresponds to how long the comparison signal reaches a predetermined level; and if the period reaches the threshold value then decision circuit toggles an indication signal corresponding to a location of the specific signal pattern; wherein both the wobble data signal and the wobble clock are derived from the read back signal.

DETAILED DESCRIPTION

In the followings, a read back signal with MSK marks is utilized as an example. The present invention utilizes digital means to detect the physical marks. As a result a phase-locked loop (PLL) or a slicer is firstly utilized to produce a digital wobble data signal and a wobble clock according to the analog read back signal. The generation means of the wobble data signal and the wobble clock are well known in the art, therefore, further details are omitted for brevity.

Figure 1:
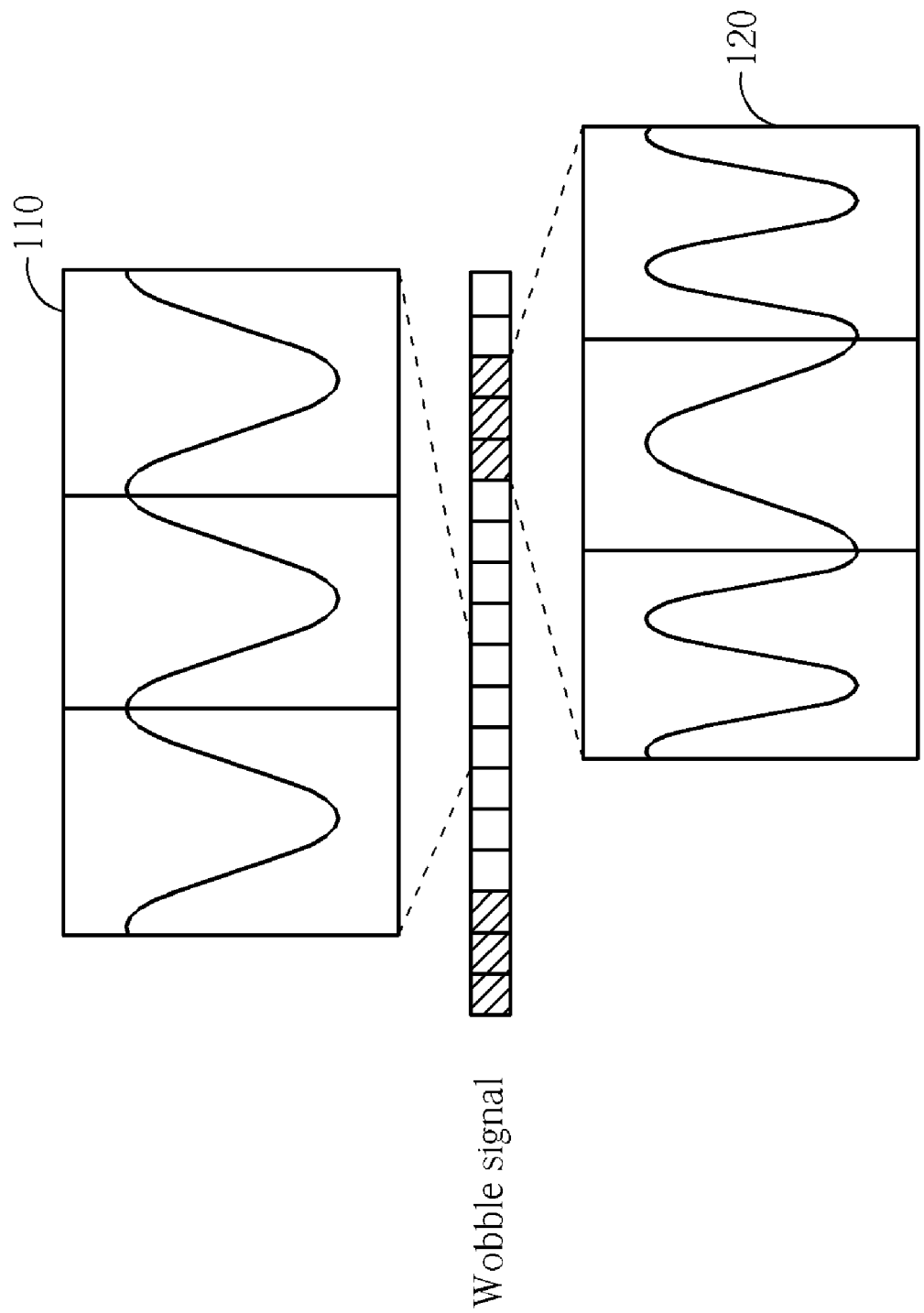
FIG. 1 is a schematic diagram of a wobble signal having a MSK mark according to the related art.
Figure 2:
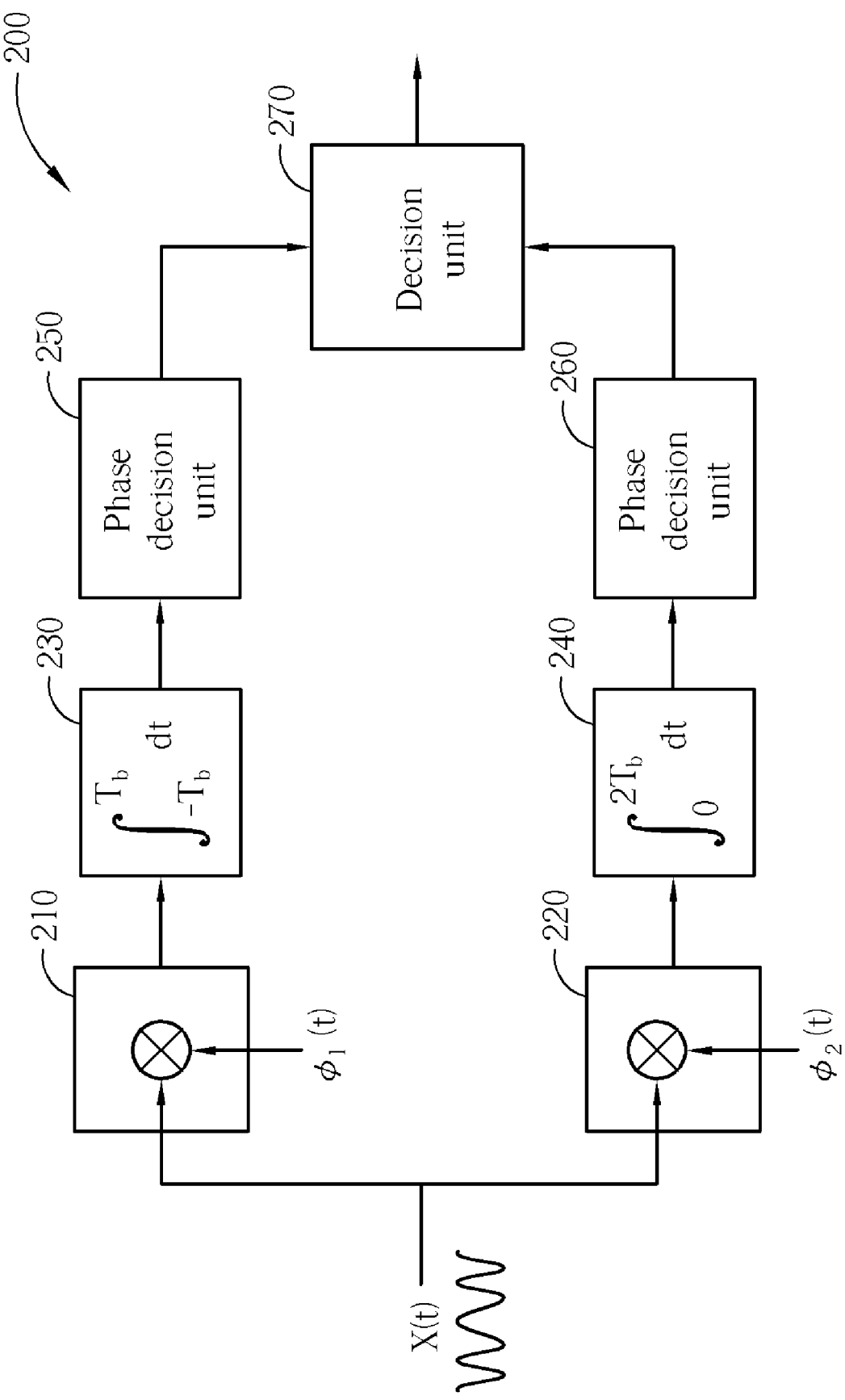
FIG. 2 is a block diagram of a decoding device for detecting the MSK marks within a wobble signal of the related art.
Figure 3:
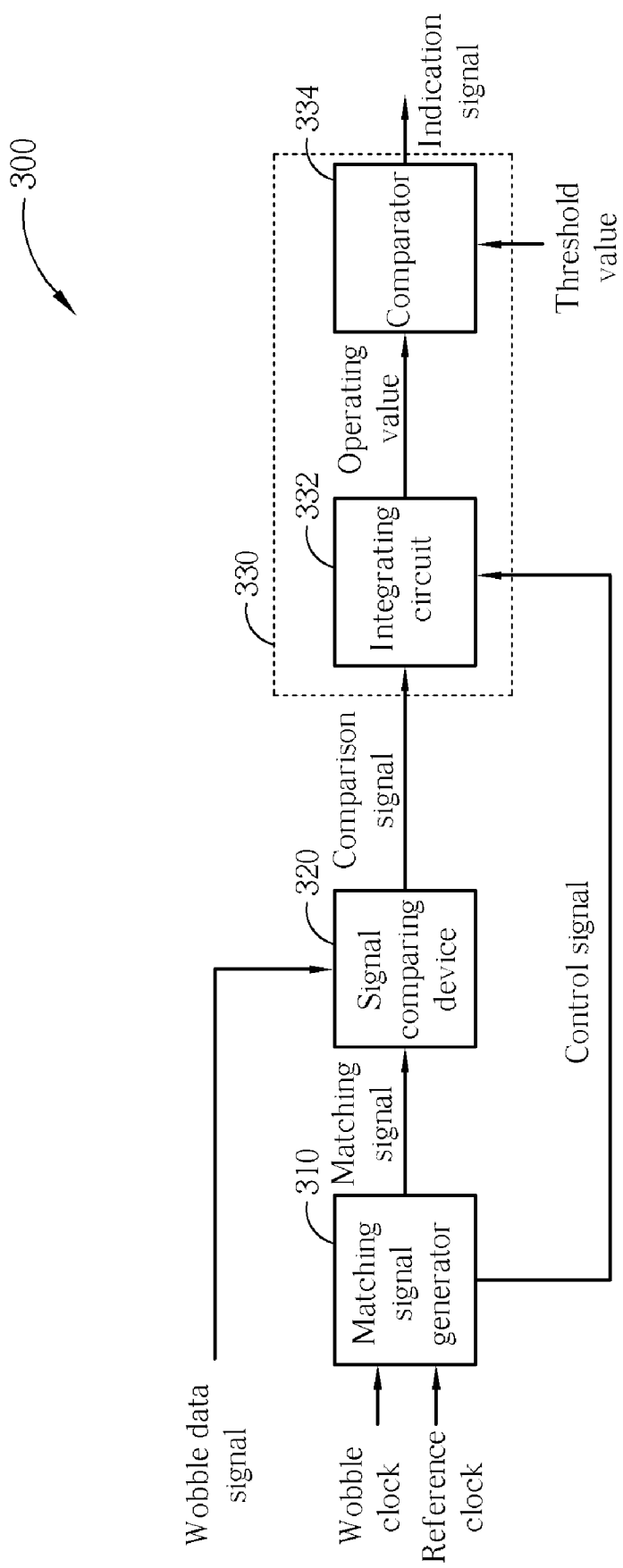
FIG. 3 is a block diagram of a signal pattern detecting apparatus according to one embodiment.

Please refer to FIG. 3, which shows a block diagram of a signal pattern detecting apparatus 300, which comprises a matching signal generator 310 for generating a matching signal that is capable of identifying a physical pattern or mark according to a reference clock and a wobble clock. Wherein the frequency of the reference clock is higher than that of the wobble clock. The signal pattern detecting apparatus 300 further comprises a signal comparing device 320, which is electrically connected to the matching signal generator 310, for comparing the matching signal with a wobble data signal to generate a comparison signal; and a decision circuit 330, which is electrically connected to the signal comparing device 320, for determining if a period reaches a threshold value. Wherein the period corresponds to how long the comparison signal reaches a predetermined level. If the period reaches the threshold value then decision circuit 330 toggles an indication signal corresponding to a location of the physical mark located on the optical disc. The predetermined period is controlled by a control signal produced from the matching signal generator 310.

Figure 4:
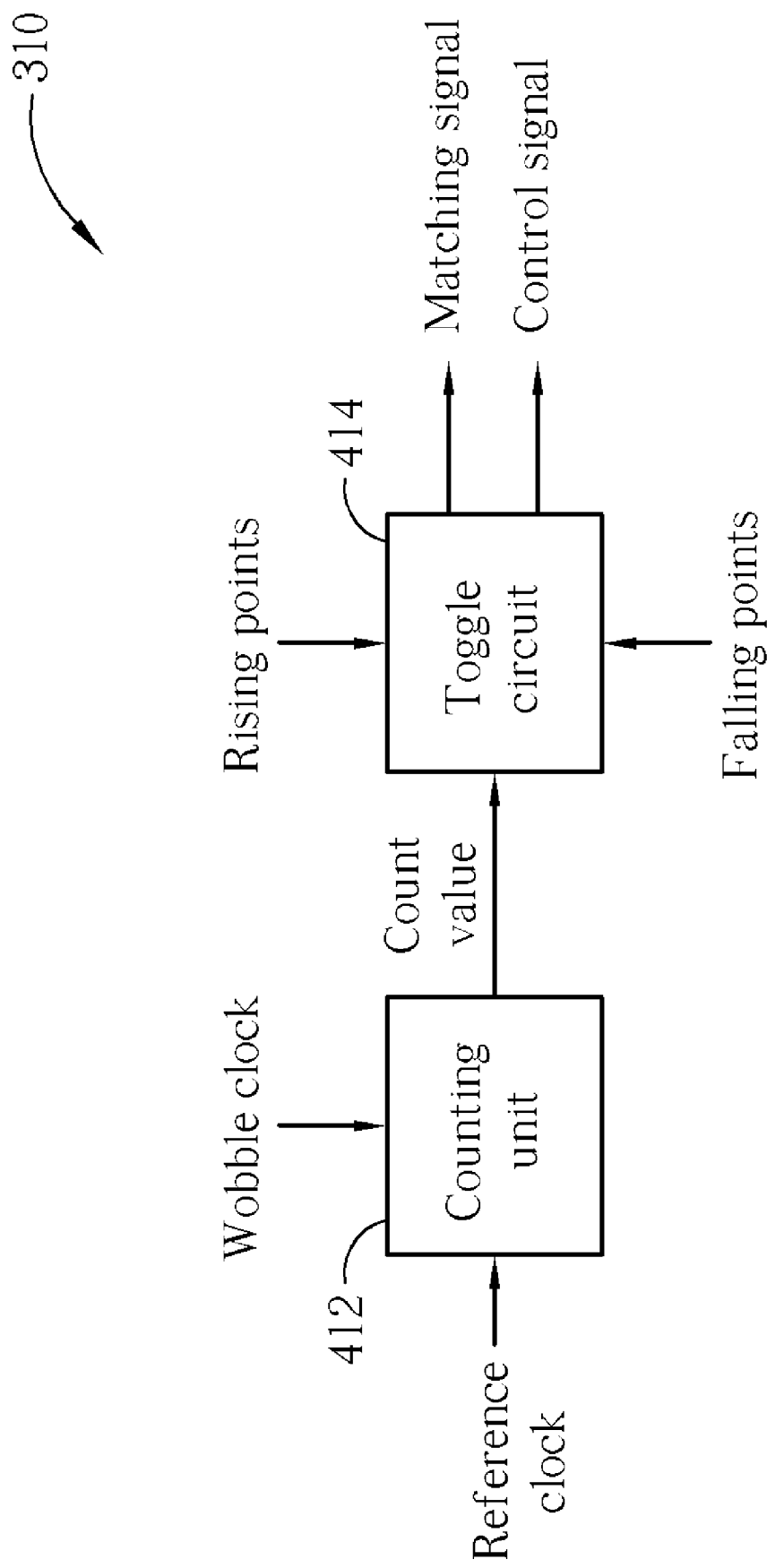
FIG. 4 is a block diagram of a matching signal generator of FIG. 3 according to one embodiment.

FIG. 4 depicts a block diagram of the matching signal generator 310 of FIG. 3 according to one embodiment. The matching signal generator 310 comprises a counting unit 412 and a toggle circuit 414. The counting unit 412 is arranged for counting the reference clock. As mentioned previously, the frequency of the reference clock is higher than that of the wobble clock. In addition, the counting operation of the counting unit 412 is reset by either the rising edge or the falling edge of the wobble clock. The toggle circuit 414 is arranged for producing the matching signal according to settings of a plurality of rising points and a plurality of falling points. In practice, the settings of the plurality of rising points and the plurality of falling points can be stored in one or more registers. The reference clock may be a channel bit clock derived from the read back signal. The frequency of the channel bit clock is 69 times of that of the wobble clock.

The counting unit 412 counts the reference clock to generate and output count values to the toggle circuit 414. In this embodiment, once a received count value achieves one of the rising points, the toggle circuit 414 will set that matching signal to be the logic high level. If the received count value achieves one of the falling points, the toggle circuit 414 will set the matching signal to be the logic low level. In other words, adjusting the setting of the plurality of rising points and falling points effects and can change the waveform of the matching signal generated by the matching signal generator 310. The configurations of the plurality of rising points and falling points are described in more detail below.

Figure 5:
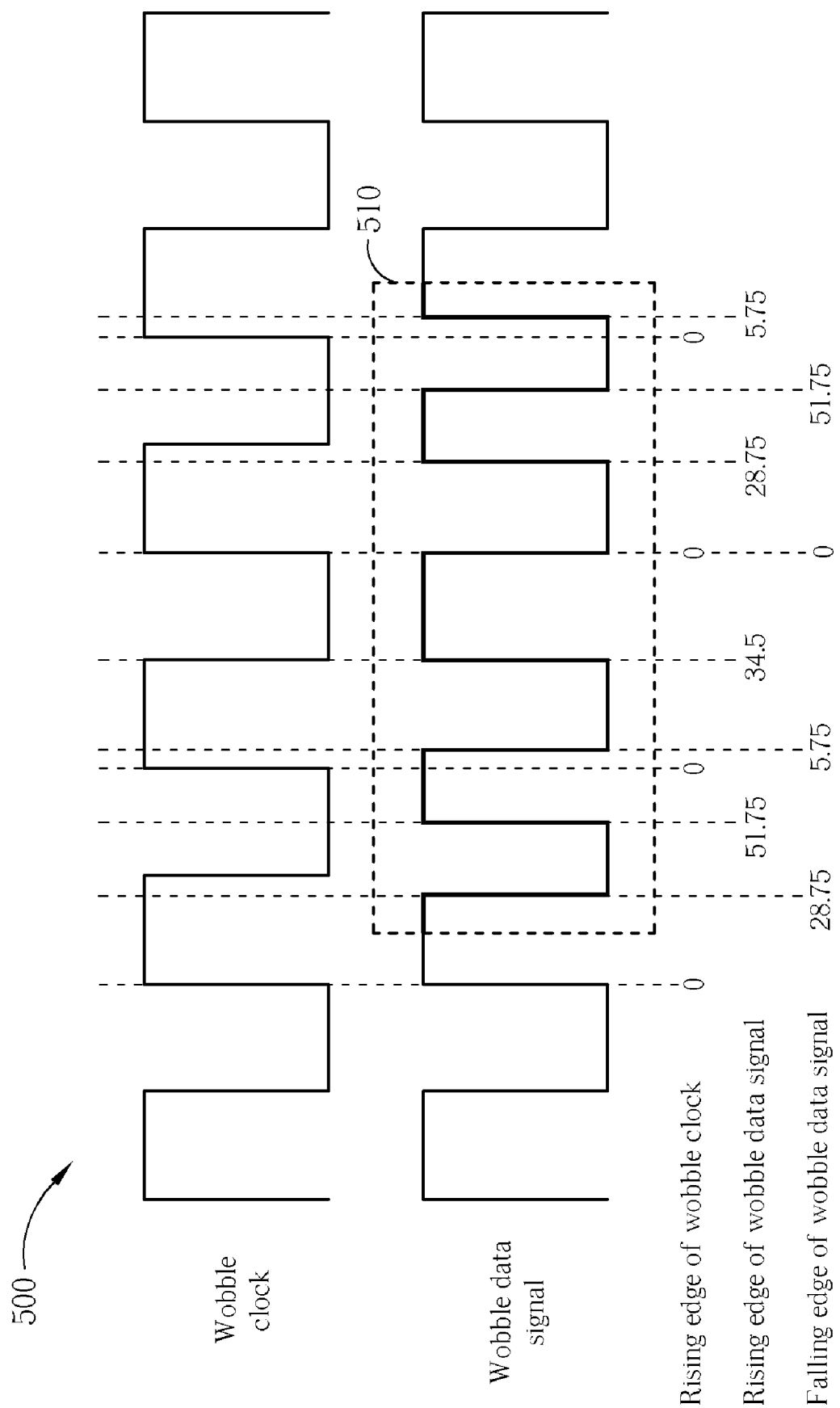
FIG. 5 illustrates a relationship between a wobble clock and a wobble data signal.

FIG. 5 shows a relationship between the wobble clock and the wobble data signal. For convenient descriptions, the wobble data signal of FIG. 5 is assumed to be a binary signal. The wobble data signal comprises an MSK mark 510, having a length of three wobble periods. Please note this important item, the waveform of the MSK mark 510 within the wobble data signal is relating to the waveform of the wobble clock. For example, when utilizing the channel bit clock to sample the wobble clock, one wobble period will be equally divided into 69 sampling points. Shown in FIG. 5, as each rising edge of the wobble clock is aligning to the sampling point 0 the rising edges of the MSK mark 510 are aligning to the sampling points 51.75, 34.5, 28.75, and 5.57, respectively. Accordingly, when the channel bit clock is utilized as the reference clock, i.e., as the working clock of the counting unit 412, the settings of the plurality of rising points and the plurality of falling points can be programmed according to the sampling points corresponding to the rising edges and falling edges of the MSK mark 510. As a result, the matching signal produced by the toggle circuit 414 will correspond to the signal pattern of the MSK mark 510.

As shown in FIG. 5, the rising edges of the MSK mark 510 respectively correspond to the sampling points 51.75, 34.5, 28.75, and 5.57. In one embodiment, the plurality of rising points are set to be 51, 34, 28, and 5 in an effort to simplify the design of the toggle circuit 414. Similarly, the falling edges of the MSK mark 510 respectively correspond to the sampling points 28.75, 5.75, 0, and 51.75. Similarly, the plurality of falling points can be set to be 29, 6, 0, and 52. As a result, the waveform of the matching signal produced by the toggle circuit 414 will be similar to the signal pattern of the MSK mark 510. In practice, the values of the plurality of rising points and the plurality of falling points are preferably set to values that will approximate the sampling points corresponding to the MSK mark. According to the foregoing descriptions, it should be appreciated that when the counting unit 412 utilizes a working clock that is not the channel bit clock and whose frequency differs from that of the channel bit clock, the settings of the plurality of rising points and the plurality of falling points must be correspondingly adjusted.

Figure 6:
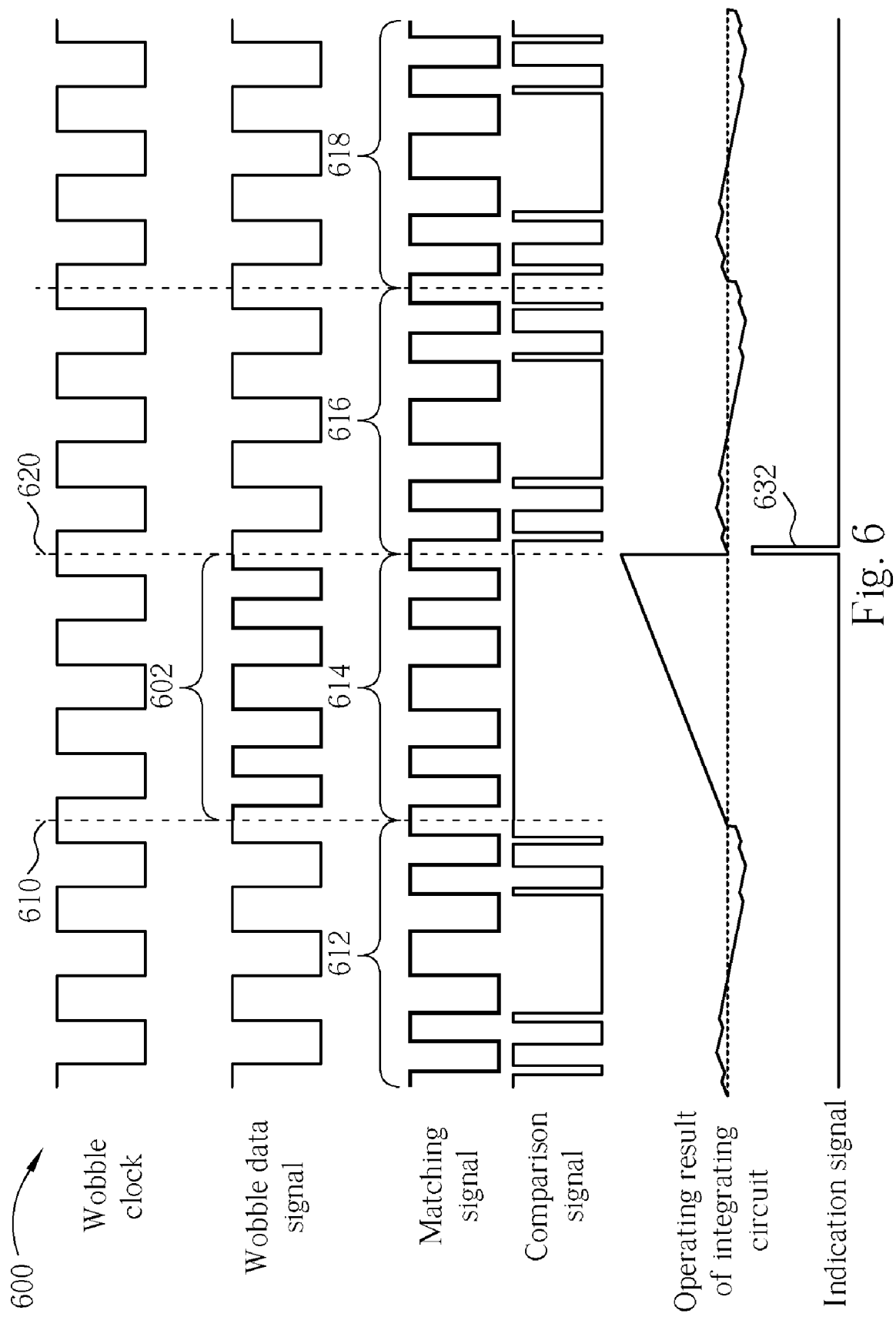
FIG. 6 is a timing diagram of the signal pattern detecting apparatus of FIG. 3 according to a first embodiment.

FIG. 6 shows a timing diagram 600 of the signal pattern detecting apparatus 300 according to a first embodiment. For convenient descriptions, both the wobble data signal and the matching signal are herein assumed to be binary signals. As shown, the wobble data signal comprises a MSK mark 602 having a length of three wobble periods. The other portions of the wobble data signal, excluding the MSK mark 602, are typically regarded as monotone. In this embodiment, waveforms that are identical to or similar as the MSK mark 602, such as the signal sections 612, 614, 616, and 618 shown in FIG. 6, repeatedly appear in the matching signal produced by the matching signal generator 310. In addition, in this embodiment, both the wobble data signal and the matching signal are assumed to be binary signals and the signal comparing device 320 can be implemented with a XNOR gate.

As mention previously, the signal comparing device 320 compares the waveform of the matching signal and the waveform of the wobble data signal to produce a comparison signal. As shown in FIG. 6, the comparison signal produced by the signal comparing device 320 is maintained in a same logic level between time point 610 and time point 620, when the signal section 614 of the matching signal is identical to the MSK mark 602 in the wobble data signal. For example, this embodiment, the comparison signal is set to the logic high between the time point 610 and time point 620. Prior to the time point 610 or after the time point 620, the waveform difference between the matching signal and the wobble data signal are obvious. Therefore, the time period the comparison signal at the same logic level becomes shorter. Accordingly, the decision circuit 330 of the signal pattern detecting apparatus 300 can detect the location of the MSK mark in the wobble data signal by determining if a total period reaches a threshold value, wherein the total period corresponds to how long the comparison signal reaches a predetermined level within the predetermined level. In this embodiment, the predetermined level is logic high.

Please refer to FIG. 3 and FIG. 4. In a preferred embodiment, the decision circuit 330 comprises an integrating circuit 332 electrically connected to the signal comparing device 320 for computing the total time period that the comparison signal reached the predetermined level to output an operating value; and a comparator 334 electrically connected to the integrating circuit 332 for comparing the operating value with a threshold value Th_value. In practice, the integrating circuit 332 may be implemented with an accumulator. In one embodiment, the toggle circuit 414 of the matching signal generator 310 outputs a control signal to the integrating circuit 332 every three wobble periods to control the integrating circuit 332 to output an operating value for representing the computing result (as shown in FIG. 6) of the total time period the comparison signal reaching the logic high level within the three wobble periods. If the operating value exceeds the threshold value Th_value, the comparator 334 toggles an indication signal, such as a pulse 632 shown in FIG. 6, to indicate that a MSK mark is detected.

As shown in the foregoing illustrations, the length of a MSK mark is three wobble periods. If the signal pattern detecting apparatus 300 operates over a predetermined time but no MSK mark is detected, it may be due to the signal section for identifying the MSK mark 602, e.g., the signal section 614, does not align to the MSK mark 602. In this situation, the signal pattern detecting apparatus 300 shifts the matching signal one wobble period ahead or one wobble period backward. The matching signal generator 310 is able to shift the matching signal by adjusting the settings of the rising points and falling points of the toggle circuit 414. For example, the matching signal generator 310 can increase each of the rising points and falling points of the toggle circuit 414 by 69 to shift the waveform of the matching signal one wobble period ahead. If the signal pattern detecting apparatus 300 operates a second time over the predetermined time but no MSK mark is detected, the matching signal would be shifted one more wobble period toward the same direction. In this way, the signal section of the matching signal for identifying the MSK mark would be aligned to or close to the MSK mark.

In another embodiment, the toggle circuit 414 outputs a control signal to the integrating circuit 332 during every wobble period. As a result, the integrating circuit 332 outputs, during every wobble period, an operating value for representing the computing result of the total time period the comparison signal reaching the logic high level within the single wobble period. In this embodiment, the comparator 334 compares a sum of three successive operating values with the threshold value Th_value to determine whether to toggle the indication signal. Specifically, if the sum of the three successive operating values is greater than the threshold value Th_value, the comparator 334 toggles the indication signal. Alternatively, the comparator 334 can be designed to decide whether to toggle the indication signal by comparing a moving sum of three successive operating values with the threshold value Th_value. In this embodiment, when the moving sum calculated by the comparator 334 exceeds the threshold value Th_value, the comparator 334 toggles an indication signal to indicate that an MSK mark is detected.

In addition, when the waveform of the signal section 612, 614, 616 or 618 of the matching signal is differ slightly from the MSK mark 602 in the wobble data signal, this may result in some spikes in the comparison signal between the time point 610 and the time point 620. If the threshold value Th_value has noise tolerance then those spikes will not affect the determining result of the decision circuit 330. In other words, the waveform of the signal sections 612, 614, 616 and 618 of the matching signal should be similar to the MSK mark 602 but is not required to be identical with the MSK mark 602.

Please note that waveform of the matching signal produced from the matching signal generator 310 is not limited to the above embodiments. In practice, the matching signal generator 310 may produce a signal having another kind of waveform that is able to identify the specific signal pattern or mark to be the matching signal.

Figure 7:
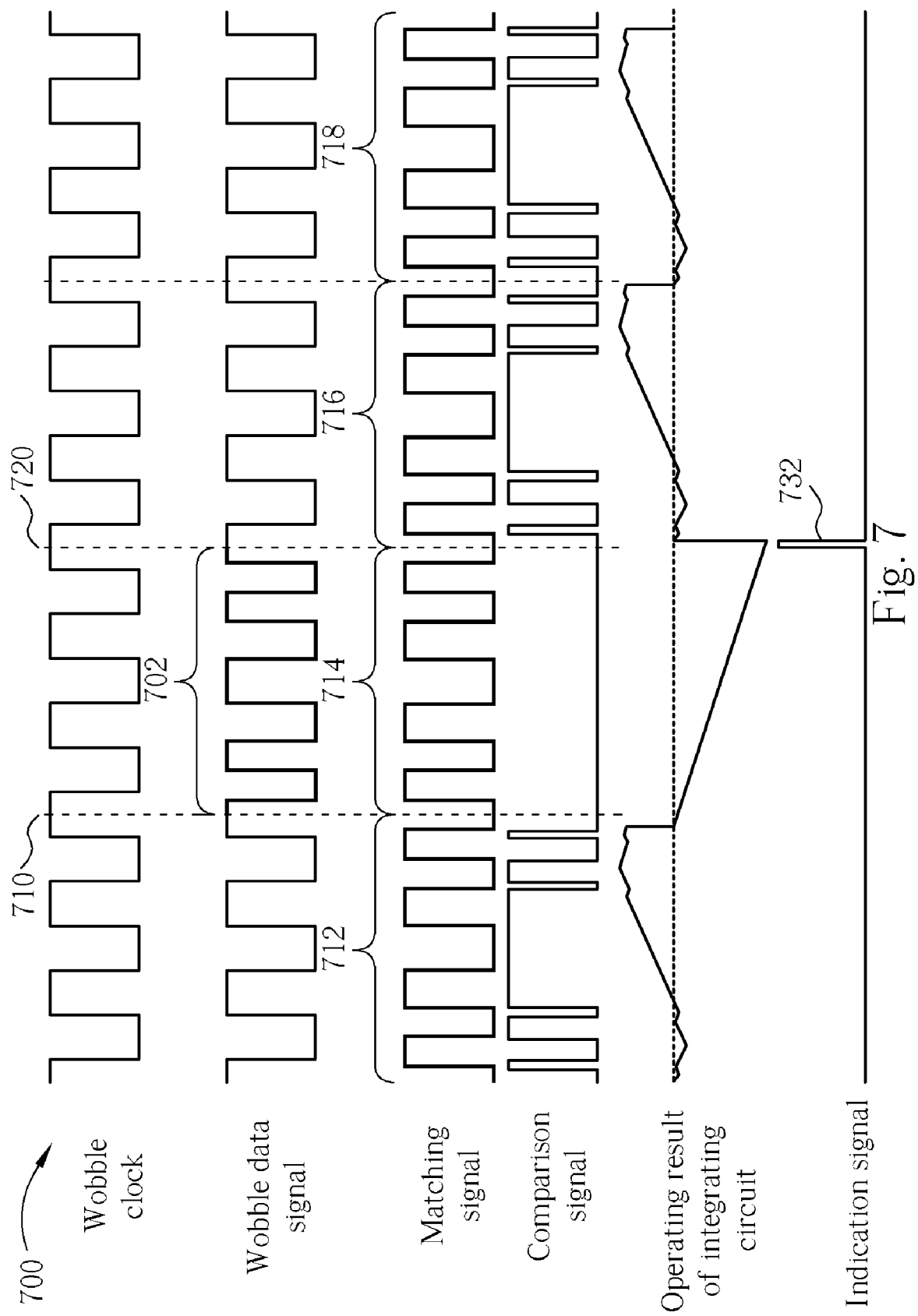
FIG. 7 is a timing diagram of the signal pattern detecting apparatus of FIG. 3 according to a second embodiment.

For example, FIG. 7 shows a timing diagram 700 of the signal pattern detecting apparatus 300 according to a second embodiment. In this embodiment, the matching signal produced from the matching signal generator 310 repeats a reversed waveform of a MSK mark 702, such as signal sections 712, 714, 716, and 718 shown in FIG. 7. Between a time point 710 and a time point 720, since the waveform of the signal section 714 of the matching signal is the reverse of the MSK mark 702, the comparison signal from the signal comparing device 320 maintains a logic low during that period. As a result, the computing result obtained by the integrating circuit 332, with respect to the period of the MSK mark 702, is less than the computing results obtained in other periods. Accordingly, the comparator 334 can decide whether to toggle an indication signal by comparing a sum (or a moving sum) of three consecutive operating values with a threshold value Th_value2. In this embodiment, when the sum (or moving sum) of the three consecutive operating values is less than the threshold value Th_value2, the comparator 334 toggles an indication signal (e.g., a pulse 732 shown in FIG. 7) to indicate that an MSK mark is detected.

Figure 8:
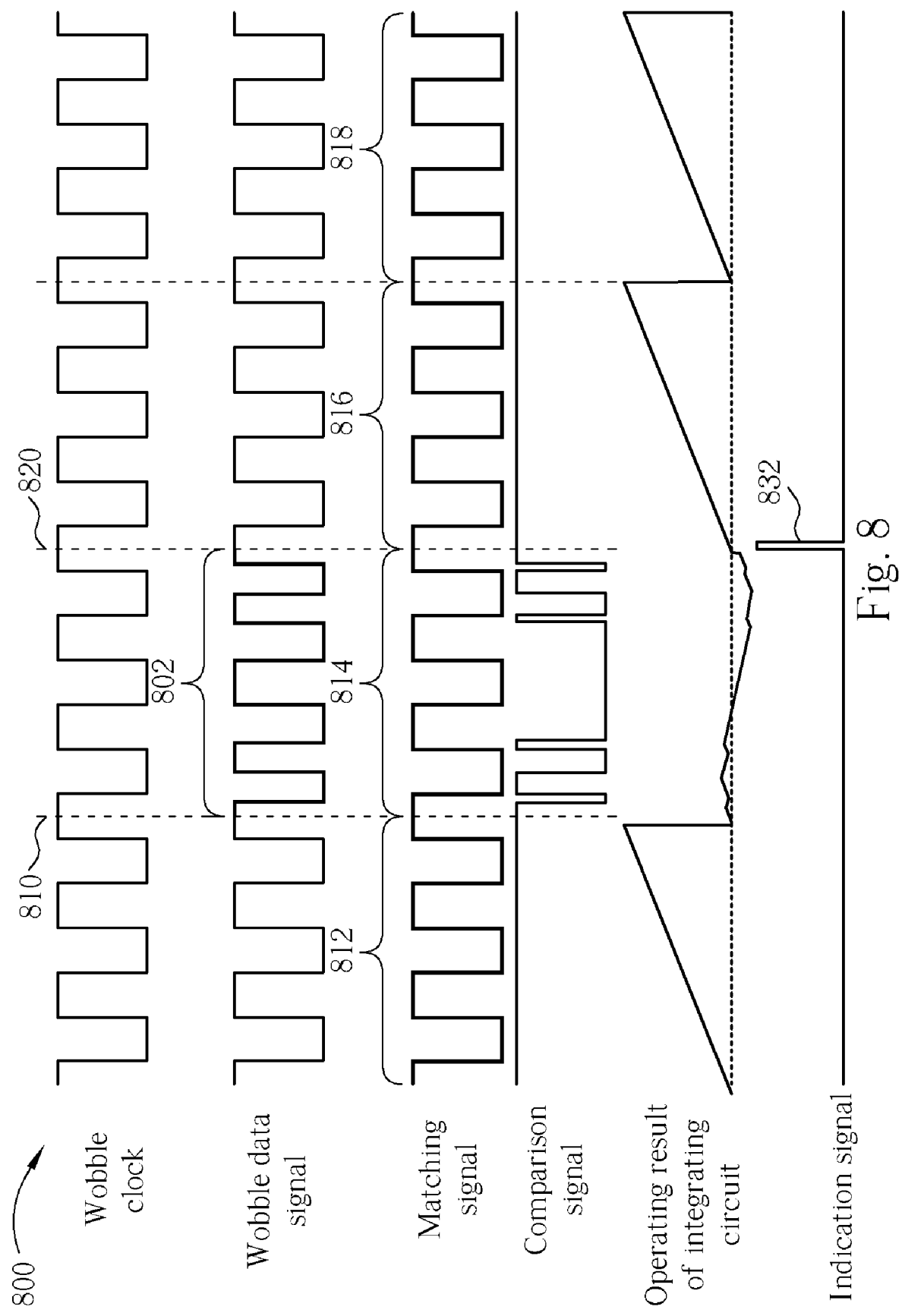
FIG. 8 is a timing diagram of the signal pattern detecting apparatus of FIG. 3 according to a third embodiment.

FIG. 8 shows a timing diagram 800 of the signal pattern detecting apparatus 300 according to a third embodiment. In this embodiment, the matching signal repeats a waveform similar or identical to the wobble clock, such as the signal shown in sections 812, 814, 816, and 818. In this embodiment, the signal pattern detecting apparatus 300 may produce the matching signal by utilizing the foregoing means. Alternatively, the signal pattern detecting apparatus 300 may simply employ the wobble clock as the matching signal. As shown in FIG. 8, between a time point 810 and a time point 820, the waveform of the signal section 814 of the matching signal is differ to a MSK mark 802. On the other hand, before the time point 810 or after the time point 820, the waveform of the matching signal is similar to or identical with the waveform of the wobble data signal. Therefore, the computing result obtained by the integrating circuit 332, with respect to the period of the MSK mark 802, will be less than the computing results obtained in other periods. Similarly, the comparator 334 can decide whether to toggle an indication signal by comparing a sum (or moving sum) of three consecutive operating values with a threshold value Th_value3. In this embodiment, when the sum (or moving sum) of the three consecutive operating values is less than the threshold value Th_value3, the comparator 334 toggles an indication signal (e.g., a pulse 832 shown in FIG. 8) to indicate that a MSK mark is detected.

Conforming to the same concept as the foregoing embodiments, the signal pattern detecting apparatus 300 can also utilize a reversed wobble clock as the matching signal for identifying the MSK marks in the wobble data signal. In practice, the matching signal can be implemented with any other signal waveforms that can be utilized to identify the specific signal pattern or mark.

In the foregoing embodiments, the signal comparing device 320 is implemented with a XNOR gate. In practice, the signal comparing device 320 may be implemented with a XOR gate. In addition, both the wobble data signal and the matching signal produced by the matching signal generator 310 are assumed to be binary signals such as in previous embodiments. This is merely for convenient descriptions and not a restriction. For example, both the wobble data signal and the matching signal can be digital signals having more than two levels. In this situation, the signal comparing device 320 can be implemented with a digital multiplier. In another embodiment, one of the wobble data signal and the matching signal is a binary signal while the other one is a digital signal having more than two levels. In this situation, the signal comparing device 320 can be implemented with an adder.

Figure 9:
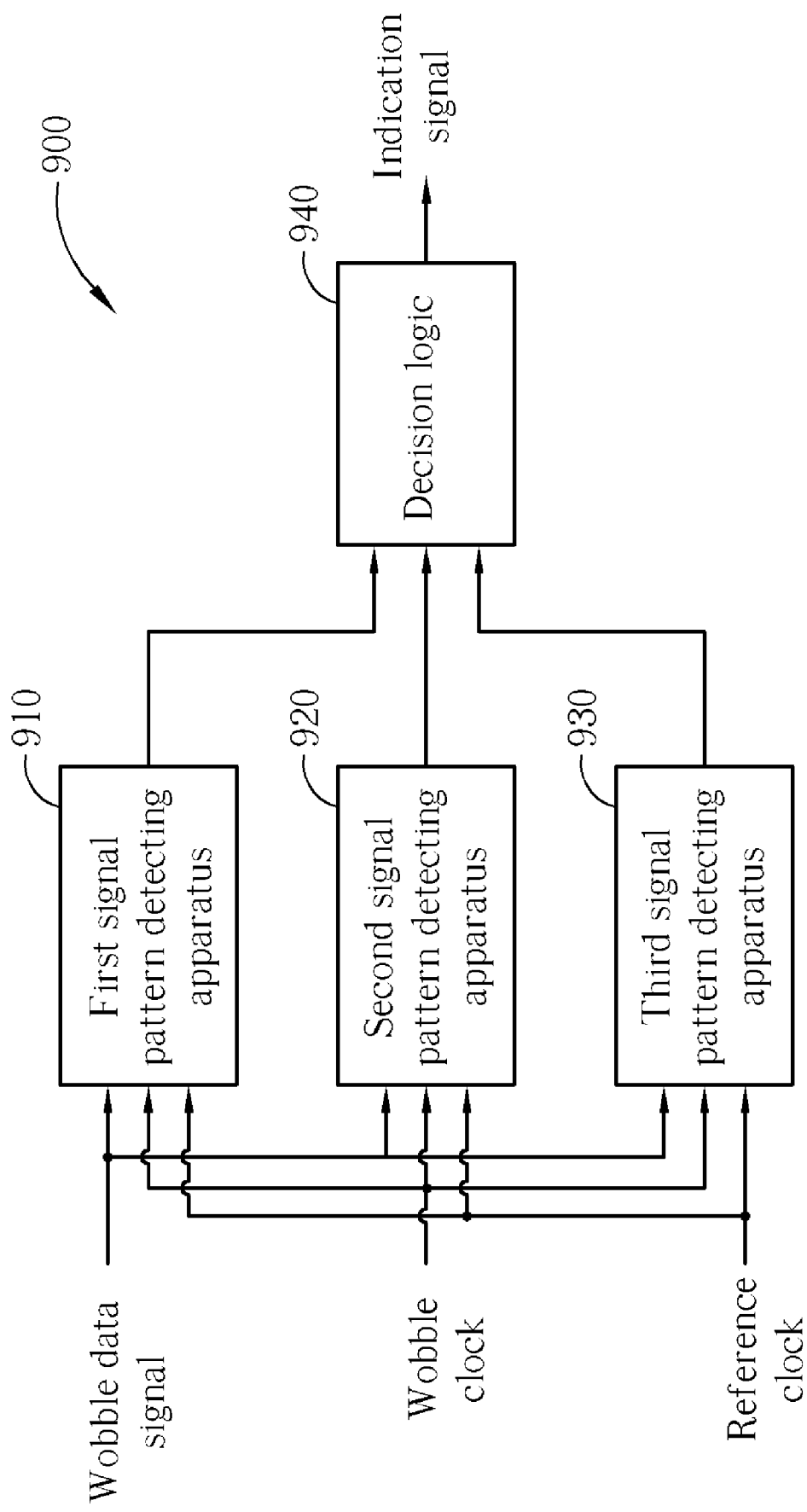
FIG. 9 is a block diagram of a signal pattern module according to one embodiment.

In practical application, two or more signal pattern detecting apparatuses may be combined together to improve the accuracy and the speed of detecting the physical marks in the wobble data signal. Please refer FIG. 9, which shows a block diagram of a signal pattern detecting module 900 according to an exemplary embodiment. The signal pattern detecting module 900 simultaneously utilizes a first signal pattern detecting apparatus 910, a second signal pattern detecting apparatus 920, and a third signal pattern detecting apparatus 930 to perform the MSK mark detection. The signal pattern detecting module 900 further comprises a decision logic 940 electrically connected to the respective signal pattern detecting apparatuses. If any one of the signal pattern detecting apparatuses toggles an indication signal then the decision logic 940 outputs the indication signal. In practice, the decision logic 940 can be implemented with an OR gate.

The operations and implementations of each signal pattern detecting apparatus of the signal pattern detecting module 900 are substantially the same as the foregoing embodiments and further details are therefore omitted for brevity. The signal pattern detecting apparatuses 910, 920, and 930 differ mostly among the matching signals employed in these signal pattern detecting apparatuses. Specifically, the timings of the matching signals are different.

Figure 10:
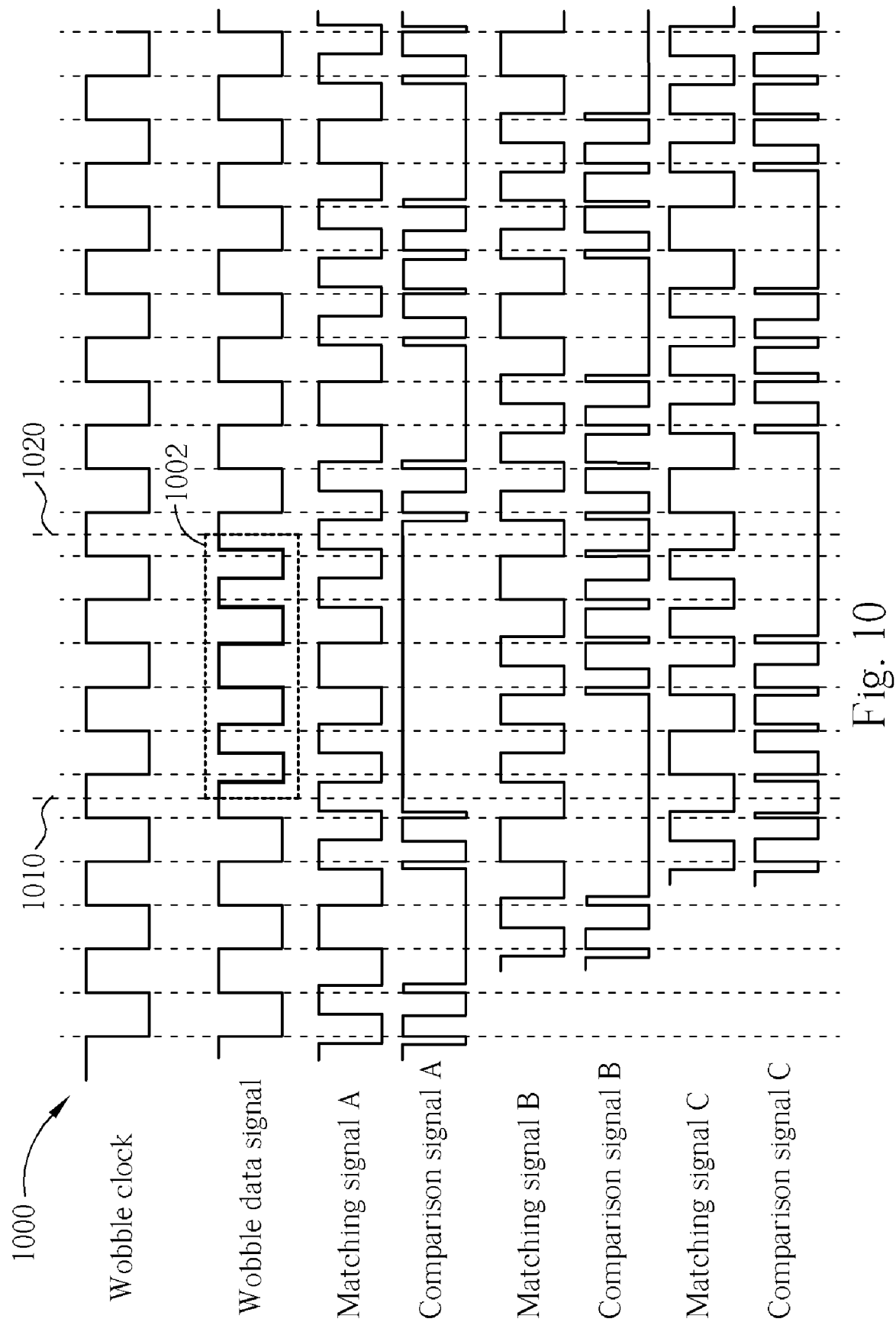
FIG. 10 is a timing diagram of the signal pattern module of FIG. 9.

Please refer to FIG. 10, which shows a timing diagram 1000 of the signal pattern detecting module 900. For convenient descriptions, the wobble data signal and the matching signals employed in the signal pattern detecting apparatuses are assumed to be binary signals, and all signal comparing devices (not shown) of the signal pattern detecting apparatuses are XNOR gates. As shown in the timing diagram 1000, the wobble data signal comprises a MSK mark 1002. The matching signals A, B, and C are produced by the matching signal generators (not shown) of the signal pattern detecting apparatuses 910, 920, and 930, respectively. In the timing diagram 1000, the matching signal B lags behind the matching signal A by one wobble period, and the matching signal C further lags behind the matching signal B by one wobble period. In addition, the comparison signals A, B, and C are respectively produced by performing XNOR operations on both the wobble data signal and in conjunction with the matching signals A, B, and C.

As mentioned previously, the length of the MSK mark 1002 is three wobble periods. Therefore, between a time point 1010 and a time point 1020, the waveform of one of the matching signals A, B, or C is similar to the MSK mark 1002. For example, in this embodiment, the waveform of the matching signal A is most similar to the MSK mark 1002 between the time point 1010 and the time point 1020. So that between the time point 1010 and the time point 1020 the comparison signal A reaches a logic high for a longer period than that of the comparison signals B and C. Thus, at about the time point 1020, the first signal pattern detecting apparatus 910 toggles an indication signal to indicate that the MSK mark 1002 is detected. At that moment, the decision logic 940 outputs the indication signal to indicate that an MSK mark is detected by the signal pattern detecting module 900.

Similarly, the signal comparing devices of the signal pattern detecting apparatuses can be implemented with XOR gates. In addition, the signal comparing device may be implemented with a digital multiplier or an adder depending on the format of the wobble data signal and the matching signal. In practice, the number of the signal pattern detecting apparatuses employed in the signal pattern detecting module 900 can be adjusted based on the design choice; it is not limited to three.

As in the foregoing illustrations, the method and apparatus for detecting a physical mark in a read back signal from an optical disc can also be applied to detect other phase-changed or frequency-changed marks such as the biphase shift keying mark (BPSK mark) of the DVD+R/+RW and HD-DVD specifications.

In contrast to the related art, the disclosed method and apparatus is efficiently capable of accurately detecting the location of the physical mark in the read back signal and also reduces the complexity of the circuitry designs required for this process.

What is claimed is:

1. A signal pattern detecting apparatus for detecting a physical mark in a read back signal being read from an optical disc, the signal pattern detecting apparatus comprising:
    a matching signal generator for generating a matching signal, capable of being utilized to identify the physical mark, according to a reference clock and a wobble clock;
    a signal comparing device electrically connected to the matching signal generator for comparing the matching signal with a wobble data signal to generate a comparison signal; and
    a decision circuit electrically connected to the signal comparing device for determining if a period reaches a threshold value, the period corresponding to how long the comparison signal reaches a predetermined level within a predetermined period, and if the period reaches the threshold value then decision circuit toggles an indication signal corresponding to a location of the specific signal pattern;
    wherein both the wobble data signal and the wobble clock are derived from the read back signal.

2. The signal pattern detecting apparatus of claim 1, wherein the matching signal comprises the physical mark.

3. The signal pattern detecting apparatus of claim 1, wherein the matching signal comprises a reversed waveform of the physical mark.

4. The signal pattern detecting apparatus of claim 1, wherein the matching signal comprises a waveform corresponding to the wobble clock.

5. The signal pattern detecting apparatus of claim 1, wherein the matching signal comprises a waveform corresponding to a reversed waveform of the wobble clock.

6. The signal pattern detecting apparatus of claim 1, wherein the physical mark corresponds to a minimum shift keying mark (MSK mark).

7. The signal pattern detecting apparatus of claim 1, wherein the physical mark corresponds to a bi-phase shift keying mark (BPSK mark) specified in the DVD+R/+RW or HD-DVD standard.

8. The signal pattern detecting apparatus of claim 1, wherein the reference clock is a channel bit clock derived from the read back signal and the reference clock is multiple times the frequency of the wobble clock.

9. The signal pattern detecting apparatus of claim 1, wherein the matching signal generator comprises:
    a counting unit for counting according to the reference clock to generate a plurality of count values; and
    a toggle circuit electrically connected to the counting unit for generating the matching signal according to the count values;
    wherein the counting unit is reset according to the wobble clock.

10. The signal pattern detecting apparatus of claim 1, wherein the decision circuit comprises:
   an integrating circuit electrically connected to the signal comparing device for generating an operating value according to the level of the comparison signal within the predetermined period or by calculating a moving sum of the level of the comparison signal; and
   a comparator electrically connected to the integrating circuit for comparing the operating value with the threshold value to generate the indication signal.

11. The signal pattern detecting apparatus of claim 10, wherein the integrating circuit is an accumulator.

12. The signal pattern detecting apparatus of claim 10, wherein the predetermined period corresponds to a specific number of periods of the wobble clock.

13. The signal pattern detecting apparatus of claim 12, wherein the integrating circuit respectively generates a plurality of operating values in a plurality of predetermined periods, and the comparator compares a sum of the operating values with the threshold value.

14. The signal pattern detecting apparatus of claim 1, wherein both the wobble data signal and the matching signal are binary signals.

15. The signal pattern detecting apparatus of claim 14, wherein the signal comparing device is a XOR logic or a XNOR logic.

16. The signal pattern detecting apparatus of claim 1, wherein both the wobble data signal and the matching signal are digital signals having more than two levels.

17. The signal pattern detecting apparatus of claim 16, wherein the signal comparing device is a digital multiplier.

18. The signal pattern detecting apparatus of claim 1, wherein the wobble data signal is binary or a digital signal of more than two levels and the matching signal is the converse of the wobble data signal.

19. The signal pattern detecting apparatus of claim 18, wherein the signal comparing device is an adder.

20. A method for detecting a physical mark in a read back signal being read from an optical disc, the method comprising:
   (a) generating a matching signal, capable of being utilized to identify the physical mark, according to a reference clock and a wobble clock;
   (b) comparing the matching signal with a wobble data signal to generate a comparison signal; and
   (c) determining if a period reaches a threshold value, the period corresponding to how long the comparison signal reaches a predetermined level within a predetermined period, and generating an indication signal corresponding to a location of the specific signal pattern if the period reaches the threshold value;
   wherein both the wobble data signal and the wobble clock are derived from the read back signal.

21. The method of claim 20, wherein the matching signal comprises the physical mark.

22. The method of claim 20, wherein the matching signal comprises a reversed waveform of the physical mark.

23. The method of claim 20, wherein the matching signal comprises a waveform corresponding to the wobble clock.

24. The method of claim 20, wherein the matching signal comprises a waveform corresponding to a reversed waveform of the wobble clock.

25. The method of claim 20, wherein the physical mark corresponds to a bi-phase shift keying mark (BPSK mark) specified in the DVD+R/+RW or HD-DVD standard.

26. The method of claim 20, wherein the physical mark corresponds to a minimum shift keying mark (MSK mark).

27. The method of claim 20, wherein the reference clock is a channel bit clock derived from the read back signal and the reference clock is multiple times the frequency of the wobble clock.

28. The method of claim 20, wherein both the wobble data signal and the matching signal are binary signals.

29. The method of claim 20, wherein both the wobble data signal and the matching signal are digital signals having more than two levels.

30. The method of claim 20, wherein one of the wobble data signal and the matching signal is a binary signal while the other signal is a digital signal having more than two levels.

31. The method of claim 20, wherein step (c) further comprises:
   generating an operating value according to the level of the comparison signal within the predetermined period; and
   generating the indication signal according to the operating value and the threshold value.

32. The method of claim 31, wherein the predetermined period corresponds to a specific number of periods of the wobble clock.

33. The method of claim 32, further comprising:
   respectively generating a plurality of operating values in a plurality of predetermined periods; and
   toggling the indication signal if a sum of the operating values exceeds the threshold value.

34. The method of claim 31, further comprising:
   toggling the indication signal if the operating value exceeds the threshold value.

\* \* \* \* \*

UNITED STATES PATENT AND TRADEMARK OFFICE
CERTIFICATE OF CORRECTION

| | | |
|---|---|---|
| PATENT NO. | : 7,668,061 B2 | Page 1 of 1 |
| APPLICATION NO. | : 11/160289 | |
| DATED | : February 23, 2010 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1283 days.

Signed and Sealed this

Twenty-eighth Day of December, 2010

David J. Kappos
*Director of the United States Patent and Trademark Office*